United States Patent
Feigel et al.

(10) Patent No.: US 8,448,775 B2
(45) Date of Patent: May 28, 2013

(54) ROTATORY SLUG LOADER

(75) Inventors: Harold Feigel, Short Hills, NJ (US);
Joseph Cardinali, Clinton, NJ (US);
Douglas Feigel, Mountainside, NJ (US)

(73) Assignee: Cardinal Machine Corp., USA, Mountainside, NJ (US)

( * ) Notice: Subject to any disclaimer, the term of this patent is extended or adjusted under 35 U.S.C. 154(b) by 255 days.

(21) Appl. No.: 12/917,914

(22) Filed: Nov. 2, 2010

(65) Prior Publication Data
US 2011/0114445 A1 May 19, 2011

Related U.S. Application Data

(60) Provisional application No. 61/283,636, filed on Nov. 18, 2009.

(51) Int. Cl.
*B65G 47/30* (2006.01)
(52) U.S. Cl.
USPC ........................................ 198/418.6; 198/426
(58) Field of Classification Search
USPC ................. 198/418.6, 426, 429, 430
See application file for complete search history.

(56) References Cited

U.S. PATENT DOCUMENTS

| | | | |
|---|---|---|---|
| 1,243,406 A * | 10/1917 | Hawthorne | 53/539 |
| 2,640,607 A | 6/1953 | De Burgh | |
| 3,166,181 A | 1/1965 | Rutkus et al. | |
| 3,215,250 A | 11/1965 | Schubert | |
| 4,053,066 A | 10/1977 | Lynch | |
| 5,090,553 A | 2/1992 | Focke et al. | |
| 5,381,884 A * | 1/1995 | Spatafora et al. | 198/433 |
| 5,992,609 A | 11/1999 | Maier et al. | |
| 6,141,943 A * | 11/2000 | Hart et al. | 53/444 |
| 6,164,045 A * | 12/2000 | Focke et al. | 53/543 |
| 6,962,250 B2 | 11/2005 | Van Liempd et al. | |
| 7,377,375 B2 | 5/2008 | Feigel et al. | |
| 7,581,634 B2 * | 9/2009 | Hart et al. | 198/418.6 |

OTHER PUBLICATIONS

International Search Report and Written Opinion, PCT/US2010/055074, dated Feb. 10, 2011.

* cited by examiner

*Primary Examiner* — Mark A Deuble
(74) *Attorney, Agent, or Firm* — Lerner, David, Littenberg, Krumholz & Mentlik, LLP

(57) ABSTRACT

A product transfer system includes a first conveyor, a second conveyor, and a rotatable transporter. The first conveyor conveys a series of products along a first axis. The second conveyor is oriented along a second axis. The second axis is spaced below the first axis. The rotatable transporter has a plurality of open compartments. The open compartments are positioned around the rotatable transporter. The rotatable transporter is adapted to move each of the open compartments along a first position, a second position, and a third position, wherein an open compartment of the plurality of open compartments is substantially aligned with the first axis to receive products from the first conveyor when located at the first position, and continues to move after the receiving the products to the second position, wherein the products are dropped on the second conveyor when said open compartment of the plurality of open compartments moves from the second position to the third position.

20 Claims, 3 Drawing Sheets

ROTATORY SLUG LOADER

CROSS-REFERENCE TO RELATED APPLICATION

The present disclosure claims the benefit of the filing date of U.S. Provisional Patent Application No. 61/283,636 filed Nov. 18, 2009, the entire disclosure of which is hereby incorporated by reference.

BACKGROUND OF THE INVENTION

The present disclosure relates to systems and methods for transferring products and, more specifically, for transferring a discrete number of baked goods, such as crackers, from a first conveyor to a second conveyor traveling in a generally different direction.

Over the years, several mechanisms have been developed to transfer goods from a first conveyor belt to a second conveyor belt traveling in a generally different direction. For instance, one mechanism (i.e., existing loaders) accept slugs (i.e., groups of crackers or cookies in side by side relationship intended to be packaged together) from a first conveyor and then positions the slug over the path of a continuously moving flight compartment of the second conveyor and then drops the slug into a moving flight compartment of the second conveyor. This mechanism subsequently returns to its initial position at the first conveyor to receive another slug to repeat the process described above. The mechanical operation of dropping slugs from existing loaders into the second conveyor utilizes a mechanism similar to the bomb bay doors of a bomber, wherein the doors swing open for each discharge and then close after each discharge. The speed of operation of existing loaders is limited by the time it takes for the slug handling mechanism to return to its initial position to receive the next slug. The operation of existing loaders is also limited by the mechanical complexity of the bomb bay door opening and closing system and the reciprocating discharge mechanism. Existing loaders also impose a restriction on the speed of the second conveyor so as to allow time for the slug to drop vertically into a moving flight compartment of the second conveyor.

SUMMARY OF THE INVENTION

A slug loader refers to the machine of this invention that receives product from a first conveyor that is moving products, such as crackers, along a path in one direction and thence transfers the product onto a second conveyor that moves the product in a second perpendicular direction to the second conveyor path. The second conveyor is at a lower elevation than the first conveyor. The first conveyor includes a transfer system that transfers product to the slug loader with intermittent motion; the slug loader is momentarily stationary as it receives product from the first conveyor. The slug loader may include an odd number of receptacles or troughs matched in size to receive the groups of crackers or cookies defining a slug. However, certain embodiments of the slug loader include an even number of receptacles or troughs. In one embodiment, the receptacles are mounted at a fixed distance from a central rotational axis, aligned between the first and second conveyors. The second conveyor receives product from the slug loader with continuous motion; both the slug loader and the second conveyor are moving in parallel in the same direction during the transfer of product from the slug loader to the second conveyor.

For illustration in a particular instance for crackers, for examples saltines, or cookies, the product group would be moved into the slug loader from an input conveyor. The crackers or cookies are in an in line arrangement on edge with the flat face of each cracker touching the flat face of the cracker in front and the cracker behind similar to the way books would be arranged on a shelf on edge. Each line of crackers being transported by the input conveying system is called a lane by those skilled in the art. The lane may be formed by a vibratory conveyor having a U-shape cross-section for holding the crackers or cookies. The U-shaped conveyor may be slightly downwardly inclined. Usually, there would be one slug loader mating with each lane of a multiple lanes of input conveyors, for example 6, 8 or even more lanes. The composite of several slug loaders, as described above for one, would also be called a slug loader.

The input first conveyor may include a mechanism for separating the crackers in a lane into equal length groups of approximately a equal number of crackers. A first mechanism adjacent the first conveyor transfers a slug to the loader in synchronization with the slug loaders rotary motion after each slug is formed by the transfer mechanism.

When more than one lane is used, the multiple of slug loaders discharge a multiple of slugs into equally spaced compartments of the moving second conveyor.

In one embodiment, the product transfer system generally includes a first conveyor, a second conveyor, and a rotatable transporter. The first conveyor conveys a series of products along a first axis. The second conveyor is oriented along a second axis, which is spaced below the first axis. The rotatable transporter has a plurality of open compartments. The open compartments are positioned around the rotatable transporter. The rotatable transporter is adapted to move each of the open compartments along a first position, a second position, and a third position. An open compartment of the plurality of open compartments is substantially aligned with the first axis to receive products from the first conveyor when located at the first position. Such compartment continues to move after receiving products to the second position. The products are dropped on the second conveyor when said open compartment of the plurality of open compartments moves from the second position to the third position.

In accordance with the embodiment described above, the product transfer system may further include a controller adapted to control the movement of the rotatable transporter. The controller is electronically coupled to a first feedback mechanism. The first feedback mechanism includes at least one sensor adapted to detect whether the first conveyor is filled with products. The controller is electronically coupled to a second feedback mechanism. The second feedback mechanism includes at least one sensor adapted to detect whether the open compartment is filled with products when located at the first position. The second conveyor may include a plurality of receptacles. The controller may be electronically coupled to a third feedback mechanism. The third feedback mechanism includes at least one sensor adapted to detect a position of each of the plurality of receptacles.

In accordance with the embodiment described above, the open compartments may be positioned at an equally spaced distance from one another. The rotatable transporter may include three open compartments angularly spaced at 120 degrees from one another. The rotatable transporter may include a wheel coupled to the plurality of open compartments. The product transfer system may further include a plurality of spokes each attaching at least one of the plurality of open compartments to the wheel. The open compartments may be directly attached around the wheel. The product transfer system may further include a shell partially surrounding the open compartments and fixed with respect to the rotatable transporter. The shell is adapted to contain the product inside the open compartments while the open compartment holding the products moves from the first position to the second position. Each of the open compartments may include a first lateral wall, a second lateral wall, an end wall and a base collectively forming a cavity dimensioned to receive the products. The first and second lateral walls are oriented substantially parallel to each other. The end wall is oriented substantially perpendicular to the first and second lateral walls. The base is oriented substantially perpendicular to the end wall and is adapted to support the products located within the cavity. Each of the open compartments has a first aperture leading to the cavity. The first aperture is located in a directly opposite relation to the base and is adapted to allow the products contained within the cavity to be dropped on the second conveyor when said open compartment is moving from the second position to the third position. Each of the open compartments has an open end leading to the cavity. The open end is located in a directly opposite relation to the end wall and is adapted to allow the products moving on the first conveyor to enter the cavity when said open compartment of the plurality of open compartments is substantially aligned with the first axis while the rotatable transporter remains stationary. The second axis defined along the second conveyor is oriented substantially transverse relative to the first axis defined along the first conveyor.

The present disclosure also relates to a method for transferring a series of products from a first conveyor to a second conveyor. An embodiment of this method includes the following steps: moving products in a first direction on a first conveyor; moving a second conveyor spaced below the first conveyor in a second direction; rotating a transporter including a plurality of open compartments for holding the products; stopping rotation of the transporter when an open compartment of the plurality of open compartments is substantially aligned with the first conveyor to allow the products moving on the first conveyor to enter said open compartment aligned with the first conveyor; rotating the transporter after the products have been received inside said open compartment of the plurality of open compartments to allow the open compartment to drop the products on the second conveyor during rotation. The tangential linear speed of said open compartment substantially matches a linear speed of the second conveyor. The method may further include the step of separating the products on the first conveyor into slugs having a length substantially similar to a length of the open compartments before introducing the products inside said open compartment of the plurality of open compartments. The step of moving a second conveyor in a second direction may include moving the second conveyor at a substantially constant speed. The step of moving a second conveyor in a second direction may include moving the second conveyor in the second direction, which is substantially perpendicular to the first direction.

BRIEF DESCRIPTION OF THE DRAWINGS

Various embodiments of the present invention will now be appreciated with reference to the appended drawings. It is appreciated that these drawings depict only some embodiments of the invention and are therefore not to be considered limiting of its scope.

DETAILED DESCRIPTION

Figure 1:
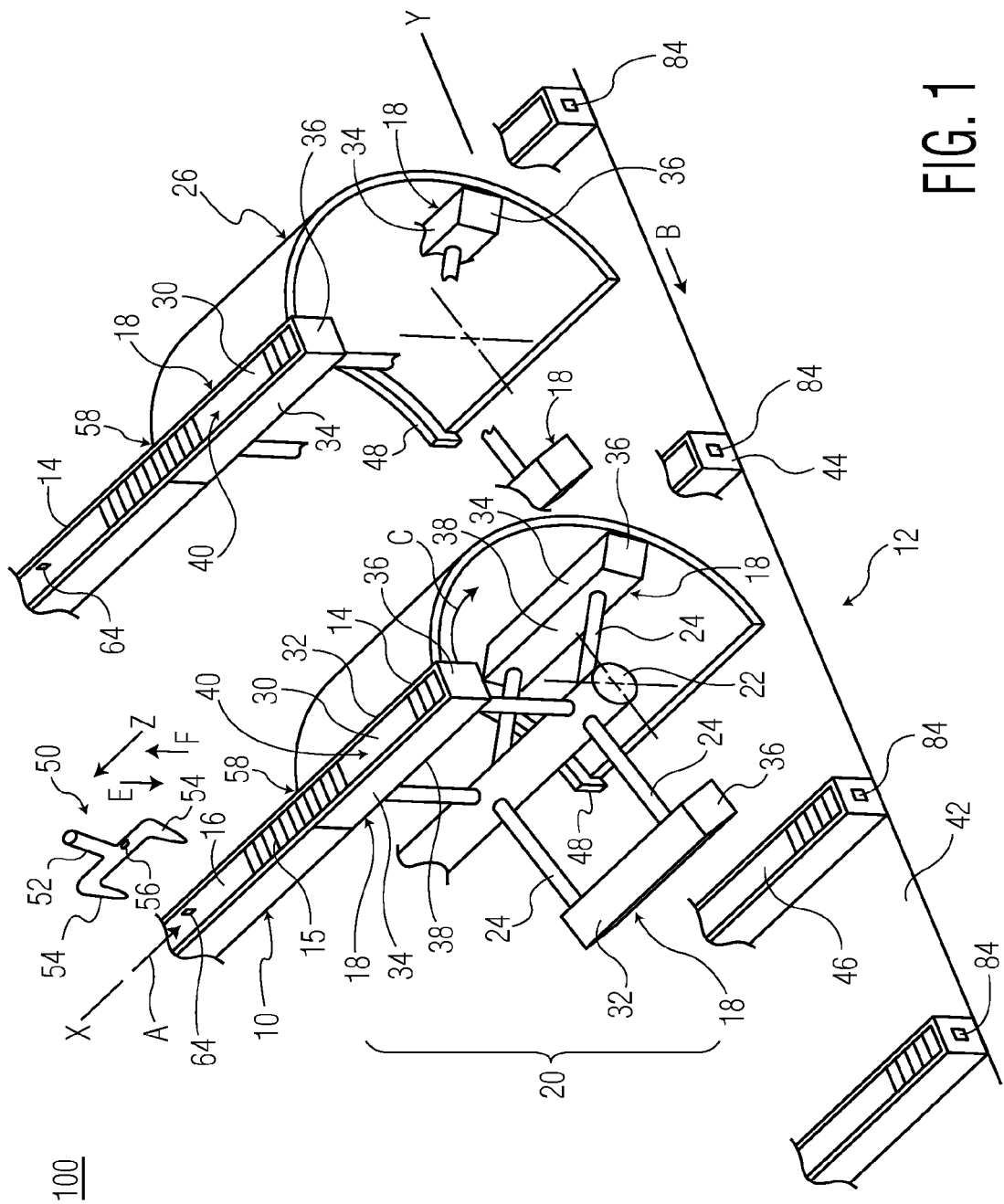
FIG. 1 is a top perspective view of an embodiment of a product transfer system including a plurality of slug loaders.

For the purposes of providing and understanding the principles of the present invention, reference will now be made to the embodiments illustrated in the drawings and specification language used to describe the same. Nevertheless, by those skilled in the art, it will be understood that no limitation of the scope of the present invention is thereby intended, and further changes in the illustrated device may be made without deviating from the scope of the present invention.

FIG. 1 shows a product transfer system 100 designed to transfer a product, for instance slugs of cookies or crackers 14, moving in a first direction, as indicated by arrow A, along a first conveyor 10 to a second conveyor 12 moving in a second direction indicated by arrow B. The first conveyor 10 is positioned along a first axis X, while the second conveyor 12 is oriented along a second axis Y. Second axis Y is spaced below first axis X. In some embodiments, the first axis X may be oriented substantially perpendicular to second axis Y.

Although the product transfer system 100 may be adapted for numerous different products or goods, an embodiment of the product transfer system 100 is specifically configured for transferring slugs 14 of crackers and/or cookies. In the present disclosure and appended claims, the term "slug" means a group of separated crackers and/or cookies, as it is known in the baking arts. Slugs 14 may have equal lengths and may contain approximately the same number of crackers or cookies. The length of the slugs 14 may be substantially similar to the length of the packages. Slugs 14 typically stem from a lane of crackers and/or cookies that are exiting an oven after baking. In the present disclosure and the appended claims, a "lane" means a line of crackers and/or cookies transported by an input conveying system, such first conveyor 10. For example, a lane may include numerous crackers linearly arranged in a row with the flat face of each cracker touching the flat face of the adjoining crackers as would be the case in a lane of soda crackers for example. In other words, the crackers would be arranged similar to the way books are arranged on a shelf.

First conveyor 10 has a cavity 16 shaped and dimensioned to receive a lane of crackers or cookies or any other suitable products or goods. Product transfer system 100 may additionally include any suitable transfer device capable of dividing the lane of crackers or cookies into slugs 14 and moving the slugs 14 into an open compartment or trough 18 of a rotatable transporter or slug loader 20 by means known to those skilled in the art. In some embodiments, first conveyor 10 may include a vibratory infeed conveying system adapted to effect a linear flow of product 15 (e.g., cookies or crackers) along first conveyor 10 through vibration. Upon activation, the vibrations of first conveyor 10 cause the product 15 to move in the direction indicated by arrow A. Product transfer system 100 may additionally include a movable fork 50 for dividing the lane of crackers or cookies in first conveyor 10 into slugs 14 and then moving the divided portion of the product 15 (e.g., cookies or crackers) into an open compartment or trough 18 of a rotatable transporter or slug loader 20. Fork 50 may have a movable support rod or member 52, at least two tines 54, and a connecting bar interconnecting the tines 54 and the movable support rod 52. The tines 54 may be spaced apart from each other at a predetermined distance that is substantially similar to the length of a slug 14. Product transfer system 100 may employ different forks of different sizes. Alternatively, fork 50 may include movable tines 54, which permit adjustment of the space (i.e., distance) between tines 54. Fork 50 is adapted to move at least in three directions, namely: (1) downwardly toward the first conveyor 10 in the direction indicated by arrow E; (2) sideways toward open compartment A in the direction indicated by arrow A; and (3) upwardly away from open compartment 18 as indicted by arrow F.

Figure 3:
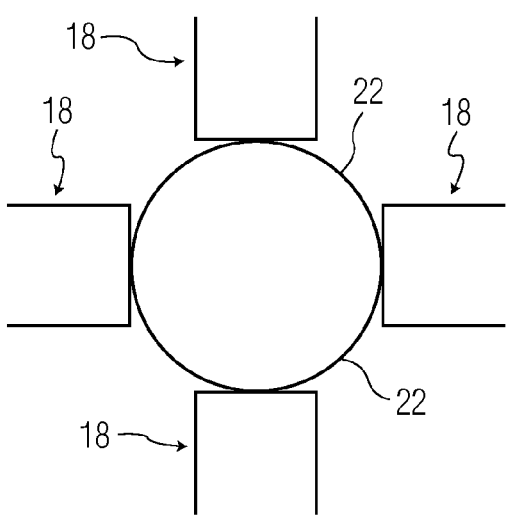
FIG. 3 is a elevation view of a further embodiment of the slug loader.

Each rotatable transporter or slug loader 20 transfers product 15 from first conveyor 10 to second conveyor and includes a plurality of open compartments or troughs 18, a wheel or shaft 22, and a plurality of spokes 24 coupling wheel 22 to each open compartment or trough 18. The number of compartments 18 may be an odd number (3, 5, etc.) of equally spaced compartments 18 so when one compartment 18 is receiving a slug (i.e., stationary), no compartment 18 is discharging onto second conveyor 12. Slug loader 20 may alternatively have an even number of compartments 18 equally spaced apart from one another, as seen in FIG. 3. In some embodiments, two spokes 24 connect one compartment 18 to wheel 22, as shown in FIG. 1. Nevertheless, fewer or more spokes 24 can connect one compartment 18 to wheel 22. Other coupling mechanisms or structures may also be utilized to connect compartments 18 to wheel 22. In addition, wheel 22 may be connected to compartments 18 without spokes 24 or other coupling structures. As seen in FIG. 3, compartments 18 can be directly attached around wheel 22.

Though FIG. 1 depicts a rotatable transporter or slug loader 20 with three open compartments 18 angularly spaced 120 degrees from one another, rotatable transporter or slug loader 20 may include more or fewer open compartments 18 arranged in different configurations. For instance, rotatable transporter or slug loader 20 may include an odd number of open compartments 18 positioned around wheel 22 at an equally spaced distance from one another. In such embodiments, the odd number of open compartments 18 streamlines the operation of rotatable slug loader 20. A slug loader 20 with an odd number of open compartments 18 can collect a slug 14 from first conveyor 10 while the rotation of transporter 20 is stopped. At this point, another open compartment 18 already contains a slug 14. Rotatable transport or slug loader 20 is then rotated to a speed matching the linear speed of the second conveyor 12 prior to discharge. Although less desirable, slug loader 20 may be momentarily stopped for discharge.

In some embodiments, each open compartment 18 is shaped and dimensioned to receive one or more slugs 14. In one specific embodiment, each open compartment 18 has a length substantially similar to the length of one slug 14 and is therefore dimensioned to hold one slug 14. Irrespective of the length, each open compartment 18 includes a first lateral wall 32, a second lateral wall 34, an end wall 36, and a base 38. First lateral wall 32, second lateral wall 34, end wall 36, and base 38 collectively form and enclose a cavity 30 dimensioned for receiving and containing one or more slugs 14. First and second lateral walls 32, 34 are spaced apart from each other and oriented substantially parallel to one another. End wall 36 interconnects first and second lateral walls 32, 34, and is oriented substantially perpendicular to first and second lateral walls 32, 34. Base 38 is oriented substantially perpendicular to end wall 36 and interconnects first and second lateral walls 32, 34.

Each open compartment 18 includes a first aperture 40 located in a directly opposite relation to base 38. First aperture 40 permits the fork 50 to transfer a slug 14 from first conveyor 10 to open compartment 18, which allows the slug 14 contained within open compartment 18 to be dropped into a receptacle 44 of the second conveyor 12 when compartment 18 is substantially aligned with a receptacle 44 of the second conveyor 12. Each open compartment 18 may also have an open end 58 located directly opposite to end wall 36. This open end 58 of the open compartment 18 allows the fork 50 to transfer a slug 14 from the first conveyor 10 into the open compartment 18 through the open end 58 when the open compartment 18 is substantially aligned with first axis X of first conveyor 10. Slug loader 20 further includes a shell 26 for containing slugs 14 inside open container 18. Shell 26 remains stationary relative to wheel 22 during operation and includes an end wall 48 for covering the open end 58 of an open compartment 18. As depicted in FIG. 1, shell 26 may have an arcuate cross-section or any other shape or configuration suitable for maintaining slugs 14 within compartment 18. Shell 26 and end wall 48 are always stationary. End wall 48 extends beyond the lower boundaries of shell 26, as shown in FIG. 1. During operation of slug loader 20, end wall 48 of shell 26 prevents slugs 18 from exiting the open compartment 18 until compartment 18 coincides with through 44, which allows slug 14 to be transferred to the second conveyor 12.

Figure 5:
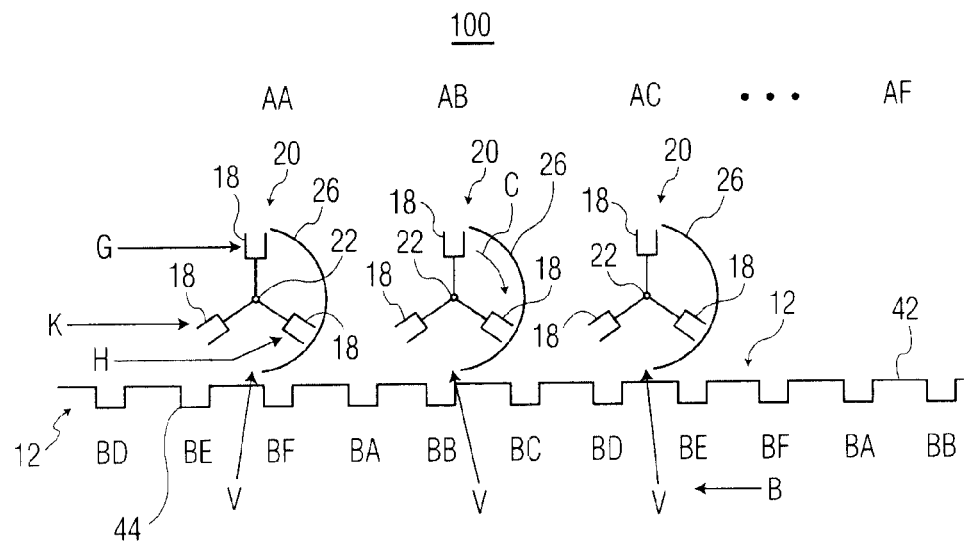
FIG. 5 is a schematic representation of the operation of the product transfer system of FIG. 1.

Second conveyor 12 is adapted to convey slugs 14 along second axis Y to a packaging machine where each slug 14 is packaged in turn. Second axis Y is spaced below first axis X. In some embodiments, second axis Y may be oriented substantially perpendicular to first axis X. Second conveyor includes a belt or platform 42 or similar means and receptacles or troughs 44 coupled to the belt 42. The receptacles 44 may be positioned on top of belt or platform 42, a shown in FIG. 1. Alternatively, the troughs 44 may be flushed with belt or platform 42, as depicted in FIG. 5. Each receptacle 44 includes a cavity 46 dimensioned for receiving one or more slugs 14. In certain embodiments, each receptacle 44 may have a length suitable to hold one slug 14. The length of the receptacle 44 may be adjusted using a movable side guide. In use, belt 42 may move receptacles 44 continuously along second axis Y at a constant linear speed. The linear speed of belt 42 is controlled by any suitable external source, such as a wrapping machine.

Figure 4:
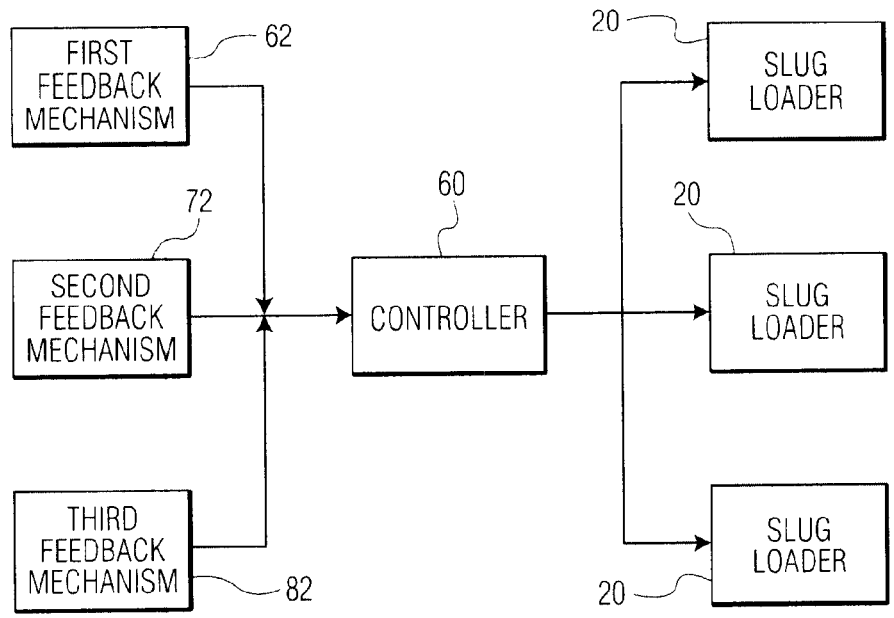
FIG. 4 is a schematic diagram illustrating the operative association of the controller and the feedback mechanisms.

With reference to FIG. 4, product transfer system 100 may additionally includes a controller 60 or means for controlling the overall movement and rotational speed of wheels 22 of slug loaders 20 and/or for controlling the position of wheel 22 in order to align one open compartment 18 with the first axis X defined along first conveyor 10. The controller 60 may include a closed loop servo system or an open loop system (not shown). The servo system or open loop system is adapted to rotate wheel 22. The open loop system may include a stepper motor. The closed loop servo system may include a plurality of feedback mechanisms. Each of the feedback mechanisms may include one or more sensors such as linear variable differential transformers (LVDT), encoders, linear velocity transducers, potentiometers, and laser interferometers.

With reference to FIGS. 1 and 4, product transfer system 100 may include first, second, and third feedback mechanisms 62, 72, and 82. Each feedback mechanism is electronically coupled to controller 60. The first feedback mechanism 62 includes one or more sensors 64 adapted to detect whether the first conveyor 10 is filled with product 15. The sensors 64 are operatively associated with some or all of the first conveyors 10 of product transfer system 100. For instance, product transfer system 100 may include at least one sensor 64 for each first conveyor 10 of product transfer system 100. Regardless of the number of sensors 64, each sensor 64 can generate an output signal indicative that a first conveyor 10 is filled with product 15. The controller 60 is adapted to receive such output signal and then control the movement of wheel 22, as discussed in detail below.

The second feedback mechanism 72 includes one or more sensors 56 adapted to detect whether the trough 18 is filled with one or more slugs 14 (i.e., divided product 15.) Product transfer system 100 may include at least one sensors 56 associated with each slug loader 20. Each sensor 56 is also adapted to generate an output signal indicative that one or more slug 14 is positioned inside trough 18. The controller 60 is adapted to receive such output signal and then control the operation of slug loaders 20, as discussed in detail below. In certain embodiments, the sensors 56 are position sensors, such as linear variable differential transformer (LVDT) sensors, capable of detecting the position of fork 50. The sensor 56 may send an output signal to the controller 60 when the fork 50 moves away from trough 18 after the product 15 has been transferred into trough 18.

The third feedback mechanism 82 includes one or more sensors 84 for detecting the position of each receptacle 44. Product transfer system 100 may include at least one sensor 84 for each receptacle 44. Each sensor 82 can generate an output signal indicative of the position and/or speed of a designated receptacle 44. The controller 60 is adapted to receive such output signal and then control the operation of slug loaders 20, as discussed in detail below.

FIG. 5 illustrates the operation of product transfer system 100. Although FIG. 5 explicitly shows 3 slug loaders 20, product transfer system 100 may include fewer or more slug loaders 20. For example, product transfer system 100 may include 6 or 8 slug loaders 20, each capable of processing a lane of product 15 from a first conveyor 10. In the embodiment depicted in FIG. 5, each slug loader 20 has been given a designation or reference character, namely AA, AB, AC, AD, AE, and AF. For instance, the product transfer system 100 illustrated in FIG. 5 may include slug loaders AA, AB, and AC. Although not explicitly shown, product transfer system 100 may also include slug loaders AD, AE and AF.

As discussed above, second conveyor 12 includes a plurality of buckets or receptacles 44. In the embodiment shown in FIG. 5, each receptacle 44 is given a designation or reference character associated with each slug loader. For example, the depicted product transfer system 100 may include receptacles BA, BB, BC, BD, BE and BF. All buckets or receptacles BA are associated with slug loader AA. Accordingly, slug loader AA discharges slugs 14 only into buckets or receptacles BA. All buckets or receptacles BB are associated with slug loader AB. Accordingly, slug loader AB discharges slugs 14 only into buckets or receptacles BB. All buckets or receptacles BC are associated with slug loader AC. Accordingly, slug loader AC discharges slugs 14 only into buckets or receptacles BC. All buckets or receptacles BD are associated with slug loader AD. Accordingly, slug loader AD discharges slugs 14 only into buckets or receptacles BD. All buckets or receptacles BE are associated with slug loader AE. Accordingly, slug loader AE discharges slugs 14 only into buckets or receptacles BE. All buckets or receptacles BF are associated with slug loader AF. Accordingly, slug loader AF discharges slugs 14 only into buckets or receptacles BF.

In operation, second conveyor 12 may run at a constant linear speed in the direction indicated by arrow B and is driven by an external source, such as a wrapping machine. Each trough 18 is adapted to move along at least three positions upon rotation of wheel 22. The tangential linear speed of each trough 18 should match the linear speed of second conveyor 12. Each trough 18 can move in the direction indicated by arrow C between a first position G and second position H, between the second position E and a third position K, and between the third position K and the first position G. In the first position G (about 12:00 o'clock position), the trough 18 is axially aligned with the first conveyor 10. In the second position H (about 4 o'clock position), the trough 18 is located adjacent to shell 26. In the third position K (about 8 o'clock), the trough 18 is in a location remote from shell 26. While a trough 18 moves between second position E and third position K, it passes through a drop point V at a tangential linear speed that substantially matches the linear speed of second conveyor 12.

With reference to FIGS. 1 and 5, the fork 50 initially moves into the first conveyor 10 in the direction indicated by arrow E to divide the product 15 into slugs 14. While wheel 22 remains stationary, the fork 50 then moves in the direction indicated by arrow A toward a trough 18 in the first position G and transfers a slug 14 into that trough 18. Subsequently, fork 50 moves in the direction indicated by arrow F away from the trough 18 located at first position G. At this point, a sensor 56 may send an output signal to the controller 60 indicating that the trough 18 at first position G is full. In one embodiment, the sensor 56 may send the output signal to controller 60 after it has detected the position of fork 50 once the fork has moved away from trough 18. Then, fork 50 moves in the direction indicated by arrow Z opposite to the direction indicated by arrow A. While fork 50 is transferring the slug 14 into the trough 18, a vibratory infeed mechanism or system is moving product 15 in the direction indicated by arrow A for continuous operation.

Subsequently, a sensor 84 detects whether a bucket 44 associated with the slug loader 20 is approaching the drop point V for said slug loader 20. For instance, a sensor 84 may detect whether a bucket BA is approaching the drop point V for slug loader AA. If so, the sensor 84 sends an output signal to the controller 60 indicative that a bucket 44 is approaching the drop point V for slug loader 20. Once the controller 60 receives a signal from a sensor 56 indicative that the trough 18 at the first position G is full and another signal from sensor 84 indicative that the bucket 44 associated with the corresponding slug loader 20 is approaching the drop point for that slug loader, the controller 60 sends a signal to the servo motor driving the wheel 22. In response to the signal sent by the controller, the servo motor drives wheel 22 to move all troughs 18 coupled to that wheel 22 simultaneously. When the wheel 22 rotates, a trough 18 moves from the first position G to the second position H, another trough 18 moves from the second position H to the third position K, and yet another trough 18 moves from the third position K to the first position G. After the troughs 18 reach their appropriate positions, the wheel 22 stops rotating, causing the troughs 18 to stop moving. As a trough 18 moves from the first position G to the second position H, the shell 26 prevents, or at least hinders, slugs 14 from escaping that trough 18. While a trough 18 moves from the second position H to the third position K, it passes through drop point V, where the slug 14 is discharged into a bucket 44 associated with the rotating slug loader 20. The tangential or peripheral linear speed of the trough 18 moving between the second position H and the third position K matches the linear speed of second conveyor 12. At this point, the trough 18 moving from the third position K to the first position G is empty (i.e., not filled with slugs 14.) Accordingly, the trough 18 now located at the first position G can be filled with the product 15 from first conveyor 10. The process can now be repeated continuously.

If the signal from sensor 56 (i.e., the signal indicative that the trough 18 at the first position G is full) is not received by controller 60, the wheel 22 of that particular slug loader 20 will not rotate and therefore the troughs 18 will not move. The buckets 44 associated with that stationary slug loader 20 will continue to move empty (without slugs 14.)

If the controller 60 does not receive a signal from sensor 64 indicative that a particular first conveyor 10 is filled with product 15, the product transfer system 100 temporarily disables the slug loader 20 associated with the empty first conveyor 10. The product transfer system 100 may continue to operate with the remaining slug loaders (if the first conveyor systems 10 associated with those slug loaders contain product 15). However, the association between the slug loaders 20 and the buckets 44 changes. In particular, product transfer system 100 employs all the buckets 44 consecutively as if the disabled slug loader 20 did not exist. In other words, the remaining slug loaders 20 will be associated with all the buckets 44, and no bucket 44 will be associated with the disabled slug loader 20.

Figure 2:
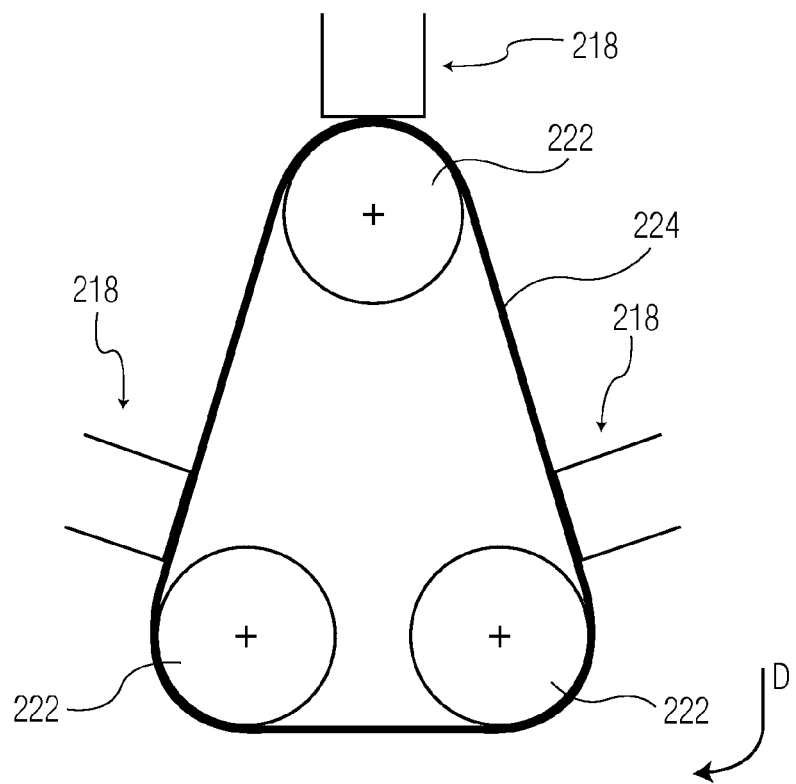
FIG. 2 is a elevation view of another embodiment of the slug loader.

With reference to FIG. 2, product transfer system 100 may include an alternate transporter 200 with three sprockets or spindles 222 and a chain, belt or band 224 or a gear arrangement. Although FIG. 2 shows a chain 224 forming an equilateral triangle, chain 224 may have other arrangements. Sprockets 222 are adapted to rotate concomitantly upon activation of a motor. Chain 224 is positioned around the three sprockets 222 and is adapted to move around sprockets 222 in the direction indicated by arrow D upon rotation of sprockets 222. Three compartments 218, which are substantially similar to open compartments 18 are attached to chain 224 at an equally spaced distance. In operation, compartments 218 move concurrently with chain 224 along linear paths when spindles 222 rotate. The configuration of transporter 200 allows slug transfer when compartments 218 runs parallel to and at the same linear speed as receptacles 44 of second conveyor 12. Although structurally different, transporter 200 operates similarly to rotatable transporter 20 to transfer slugs 14 from first conveyor 10 to second conveyor 12.

As discussed above, product transfer system may include a slug loader 20 in which the open compartments 20 are directly connected to the wheel 22, as shown in FIG. 3. In addition, the slug loader 20 may include an even number of open compartments 20, as also shown in FIG. 3.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

It will be appreciated that the various dependent claims and the features set forth therein can be combined in different ways than presented in the initial claims. It will also be appreciated that the features described in connection with individual embodiments may be shared with other of the described embodiments.

The invention claimed is:

1. A product transfer system, comprising:
    a first conveyor for conveying a series of products along a first axis;
    a second conveyor oriented along a second axis the second conveyor having a plurality of receptacles situated along the second axis;
    a plurality of rotatable transporters located intermediate the first and second conveyor, wherein each of the plurality of rotatable transporters has at least one compartment, wherein each of the plurality of rotatable transporters has at least one pre-assigned receptacle designated from the plurality of receptacles, wherein each of the plurality of rotatable transporters is configured to move the at least one compartment along a first position, a second position, and a third position, wherein the at least one compartment is substantially aligned with the first axis to receive products from the first conveyor when located at the first position, and continues to move after receiving products to the second position, wherein the products are deposited in the at least one pre-assigned receptacle when the at least one compartment moves from the second position to the third position, wherein each of the plurality of rotatable transporters alone does not deposit the products in each and every receptacle of the plurality of receptacles, rather the combined depositing of each of the plurality of rotatable transporters operating in concert transfers product to each and every receptacle as the plurality of receptacles passes the plurality of rotatable transporters.

2. The product transfer system according to claim 1, further comprising a controller adapted to control the movement of the plurality of rotatable transporters.

3. The product transfer system according to claim 2, wherein the controller is electronically coupled to a first feedback mechanism, the first feedback mechanism including at least one sensor adapted to detect whether the first conveyor is filled with the products.

4. The product transfer system according to claim 3, wherein the controller is electronically coupled to a second feedback mechanism, the second feedback mechanism including at least one sensor adapted to detect whether the at least one compartment is filled with the products when located at the first position.

5. The product transfer system according to claim 4, wherein the controller is electronically coupled to a third feedback mechanism, the third feedback mechanism including at least one sensor adapted to detect a position of each of the plurality of receptacles.

6. The product transfer system according to claim 5, wherein the controller is adapted to disable at least one of the plurality of rotatable transporters where the controller fails to receive a signal from the first feedback mechanism.

7. The product transfer system according to claim 5, wherein the controller is adapted to reassign, while the product transfer system is in continuous operation, the at least one pre-assigned receptacle from an at least one disabled rotatable transporter of the plurality of rotatable transporters to an operational rotatable transporter of the plurality of rotatable transporters such that each and every receptacle of the plurality of receptacles continuously receives products deposited by the operational rotatable transporter despite the disabled rotatable transporter.

8. The product transfer system according to claim 2, wherein the controller is adapted to reassign, while the product transfer system is in continuous operation, the at least one pre-assigned receptacle from a disabled rotatable transporter of the plurality of rotatable transporters to an operational rotatable transporter of the plurality of rotatable transporters such that each and every receptacle of the plurality of receptacles will be continuously occupied by the products deposited by the operational rotatable transporter despite the disabled rotatable transporter.

9. The product transfer system according to claim 1, wherein the at least one compartment comprises three compartments angularly spaced at 120 degrees from one another.

10. The product transfer system according to claim 1, wherein each of the plurality of rotatable transporters includes a wheel coupled to the at least one compartment.

11. The product transfer system according to claim 10, wherein each of the plurality of rotatable transporters has a plurality of compartments and a plurality of spokes, the plurality of spokes attaching at least one of the plurality of compartments to the wheel.

12. The product transfer system according to claim 1, further comprising a shell partially surrounding the at least one compartment and fixed with respect to each of the plurality of rotatable transporters, wherein the shell is adapted to contain the products inside the at least one compartment while the at least one compartment holding the products moves from the first position to the second position.

13. The product transfer system according to claim 1, wherein the at least one compartment includes a first lateral wall, a second lateral wall, an end wall and a base collectively forming a cavity dimensioned to receive the products, the first and second lateral walls being oriented substantially parallel to each other, the end wall being oriented substantially perpendicular to the first and second lateral walls, and the base being oriented substantially perpendicular to the end wall and being adapted to support the products located within the cavity.

14. The product transfer system according to claim 13, wherein the at least one compartment has a first aperture leading to the cavity, the first aperture being located in a directly opposite relation to the base and adapted to allow the products contained within the cavity to be discharged on the second conveyor when the at least one compartment is moved from the second position to the third position.

15. The product transfer system according to claim 13, wherein the at least one compartment has an open end leading to the cavity, the open end being located in a directly opposite relation to the end wall and adapted to allow the products moving on the first conveyor to enter the cavity when the at least one compartment is substantially aligned with the first axis while the rotatable transporter remains stationary.

16. A method for transferring a series of products from a first conveyor to a second conveyor, comprising:

moving products in a first direction on a first conveyor;
moving a second conveyor in a second direction, the second conveyor having a plurality of receptacles;
rotating a plurality of transporters, each of the plurality of transporters having at least one compartment for holding the products, wherein each of the plurality of transporters is situated intermediate to the first conveyor and second conveyor;
pre-assigning at least one of the plurality of receptacles to each of the plurality of transporters such that each of the plurality of receptacles is assigned to only one of the plurality of transporters;
depositing the products from a first conveyor into the at least one compartment of each of the plurality of transporters when the at least one compartment of each of the plurality of transporters is substantially aligned with the first conveyor to allow the products moving on the first conveyor to enter the at least one compartment aligned with the first conveyor;
rotating the transporter after the products have been deposited inside the at least one compartment such that the at least one compartment deposits the products in an assigned receptacle during rotation, wherein the combined depositing of each of the plurality of receptacles operating in concert occupies each and every receptacle with product as the plurality of receptacles pass the plurality of transporters.

17. The method according to claim 16, further comprising separating the products on the first conveyor into slugs having a length substantially similar to a length of the at least one compartment before depositing the products inside the at least one compartment.

18. The method according to claim 16, wherein the step of moving a second conveyor in a second direction includes moving the second conveyor at a substantially constant speed.

19. The method according the claim 18, further comprising disabling at least one of the plurality of transporters where a controller fails to receive a signal from a first feedback mechanism.

20. The method according the claim 19, further comprising reassigning, while the product transfer system is in continuous operation, the at least one receptacle from the at least one disabled transporter to an operational transporter such that each and every receptacle of the plurality of receptacles is continuously occupied by the products deposited by operational transporter despite the disabled transporter.

* * * * *